(12) United States Patent
McGrew et al.

(10) Patent No.: US 7,426,636 B1
(45) Date of Patent: Sep. 16, 2008

(54) COMPACT SECURE DATA COMMUNICATION METHOD

(75) Inventors: David A. McGrew, Poolesville, MD (US); Jan Vilhuber, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 753 days.

(21) Appl. No.: 10/453,237

(22) Filed: Jun. 2, 2003

(51) Int. Cl.
*H04L 9/00* (2006.01)
(52) U.S. Cl. .................................................. 713/160
(58) Field of Classification Search .................. 713/160
See application file for complete search history.

(56) References Cited

U.S. PATENT DOCUMENTS

2002/0001302 A1* 1/2002 Pickett ........................ 370/352
2002/0141414 A1* 10/2002 Rezaiifar et al. ............ 370/394

OTHER PUBLICATIONS

M. Degermark, et al., "IP Header Compression," Feb. 1999, Request for Comments: 2507, pp. 1-47.

A. Shacham, et al., "IP Payload Compression Protocol (IPComp)," Dec. 1998, Request for Comments: 2393, pp. 1-10.
D. Harkins, et al., "The Internet Key Exchange (IKE)," Nov. 1998, Request for Comments: 2409, pp. 1-41.
S. Kent, et al., "IP Encapsulating Security Payload (ESP)," Nov. 1998, Request for Comments: 2406, pp. 1-22.
Bruce Thompson, et al., "Tunneling Multiplexed Compressed RTP ("TCRTP")," Nov. 2, 2002, Internet Draft, File: <draft-ietf-avt-tcrtp-04.txt>, 18 pages.
S. Casner, et al., "Compressing IP/UDP/RTP Headers for Low-Speed Serial Links," Feb. 1999, Request for Comments: 2508, pp. 1-24.

* cited by examiner

*Primary Examiner*—Gilberto Barron
*Assistant Examiner*—Devin Almeida
(74) *Attorney, Agent, or Firm*—Hickman Palermo Truong & Becker LLP

(57) ABSTRACT

A compact secure data communication method is disclosed. In one embodiment, a compact security protocol provides cryptographic services on IP, UDP, and TCP packets with minimal bandwidth degradation due to encapsulation overhead. The disclosed protocol may be used, for example, in converged networks that carry both voice-over-IP and data traffic in and wireless networks, in which it is imperative to minimize per-packet overhead. The disclosed protocol provides as much security as possible, by authenticating the uncompressed headers rather than the compressed headers.

26 Claims, 7 Drawing Sheets

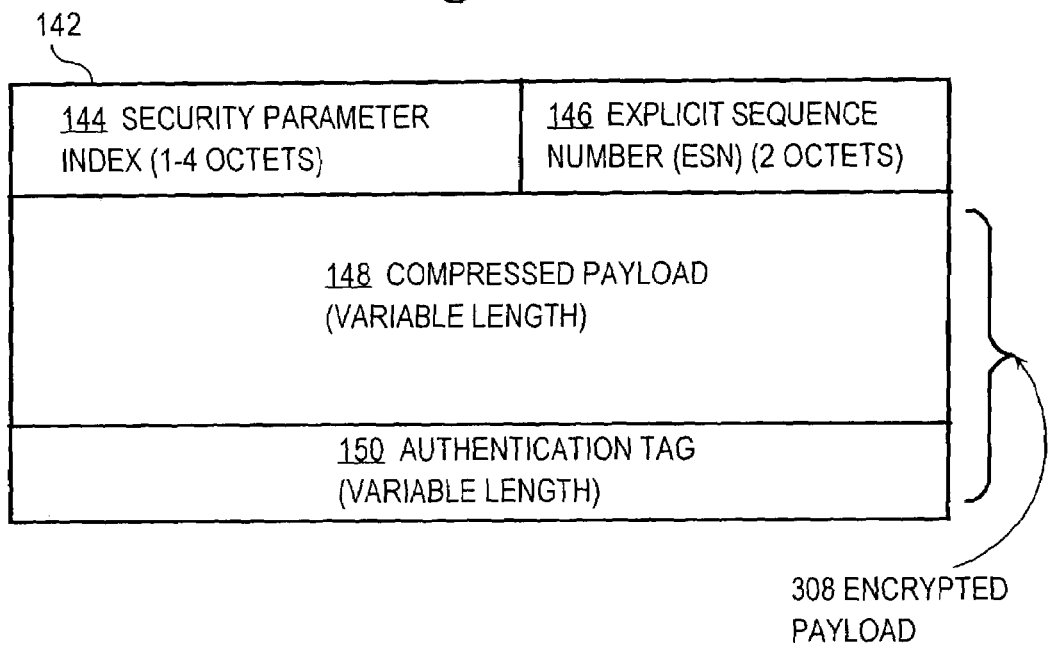

COMPACT SECURE DATA COMMUNICATION METHOD

FIELD OF THE INVENTION

The present invention generally relates to data communication. The invention relates more specifically to a compact secure data communication method.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Communicating voice-over-IP data over a virtual private network ("VPN") that is established using the Internet security protocol ("IPsec") currently is problematic due to bandwidth degradation. A VoIP packet with a 20-octet voice payload may be expanded by up to 80 bytes when the IPsec encapsulating security payload ("ESP") approach is used. When this expansion effect is multiplied by millions of packets, the effect is significant. Further, when the VPN is run over a slow link such as a 56 Kbyte connection, the effect can result in significant service degradation. However, numerous such slow links are deployed around the world. Moreover, VPN processing equipment typically makes no special provision for processing voice over a slow link, other than possibly applying quality of service (QoS) treatment. Thus, there is a need for an improved way to communicate VoIP over VPNs that use IPsec, especially those that use slow links.

Similarly, communication on links using codecs that conform to ITU Recommendation G.729 uses 20 Kbps at 50 packets per second, and no more than a few bytes of overhead per packet is advisable. In this context, communication with minimal overhead is needed. Links that use G.711 codecs have similar issues.

Tunnel communication established using the Security Protocol for the Internet ("IPsec") using the Encapsulating Security Payload (ESP) provides confidentiality, message authentication, and anti-replay protection to generic IP network traffic. The IPsec protocol with ESP is defined in IETF Request For Comments ("RFC") 2406. This protocol has proven quite useful in practice; however, ESP tunnel mode adds a significant amount of data to an encapsulated message. This overhead has proven detrimental to applications that use a significant number of short packets, such as Voice over IP. Thus, it would be desirable to have a data communication protocol that provides the same security processing as ESP, but has a minimal overhead.

Certain data compression approaches are known for use in processing IP traffic. For example, a known IP header compression approach, which reduces encapsulation overhead by reducing the size of packet headers, is the most important application of stateful compression. In a stateless compressor, each packet is compressed independently. In a stateful compressor, the compressed form of a packet may depend on state information obtained from other packets. IP header compression is described in M. Degermark et al., RFC 2507, "IP Header Compression," February 1999.

In contrast, the IP Payload Compression Protocol, as described in A. Shacham et al., RFC 2393, "IP Payload Compression Protocol (IPComp)," August 1998, is restricted to compressors that are not stateful. The IP Header Compression RFC specifies a broad framework for compressing headers in IP (versions four and six), UDP, and TCP. This work has been extended to include IP/UDP/RTP and RTP across tunnels, as respectively described in Casner et al., RFC 2508, "Compressing IP/UDP/RTP Headers for Low-Speed Serial Links," 1999, and draft-ietf-avt-crtp-enhance-04.txt, "Compressing IP/UDP/RTP headers on links with high delay, packet loss and reordering."

It is desirable to have a compact security protocol that can work with the broad framework of RFC 2507, allowing any of the existing compression methods to be used in a straightforward manner.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram of a packet formatted according to a compact security protocol;

DETAILED DESCRIPTION OF THE PREFERRED EMBODIMENT

Figure 1A:
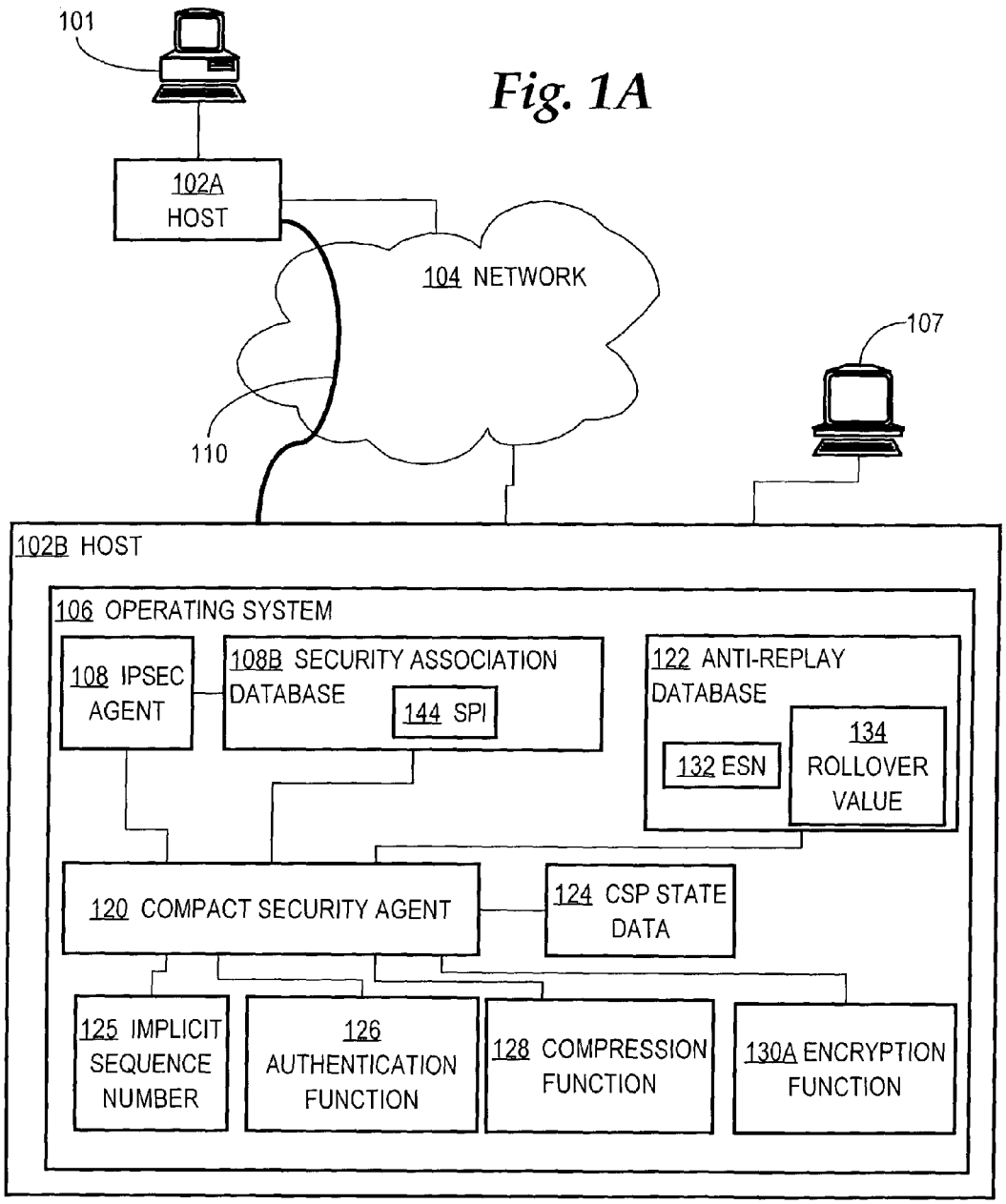
FIG. 1A is a block diagram of a network context in which an embodiment can be used.

A compact secure data communication method is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Compact Security Protocol |
| | 2.1 Functional Elements |
| | 2.2 Protocol Packet Format |
| | 2.3 Packet Processing Methods |
| | 2.4 State Information and Other Processing Details |
| | 2.5 Improvements Over Existing Practice |
| 3.0 | Implementation Mechanisms—Hardware Overview |
| 4.0 | Extensions and Alternatives |

1.0 General Overview

The needs identified in the foregoing Background, and other needs and objects that will become apparent for the following description, are achieved in the present invention, which comprises, in one aspect, a method of providing compact secure data communication, comprising creating and storing a data packet comprising a security parameter index value, an explicit sequence value, a compressed encrypted payload, and an authentication tag value, and sending the data packet over a non-secure data communication network to a receiver. In one feature, the data packet comprises a security parameter index value that indexes a security association that has been negotiated between a sender and a receiver and is stored in a security association database at the sender, an explicit sequence value, a compressed encrypted payload, and an authentication tag value.

In another feature, the explicit sequence value comprises a least-significant subset of octets of an implicit sequence number that is stored internally by a sender and that has a size in octets larger than the explicit sequence number. In a related feature, the explicit sequence value comprises a least-significant two octets of an implicit sequence number that is stored internally by a sender and that has a size of eight octets. In another related feature, the explicit sequence value comprises a least-significant subset of octets of an implicit sequence number that is stored internally by a sender and that has a size in octets larger than the explicit sequence number, and wherein the authentication tag is determined by applying an authentication function to an implicit sequence value and an uncompressed payload.

In still another feature, the explicit sequence value comprises a least-significant subset of octets of an implicit sequence number that is stored internally by a sender and that has a size in octets larger than the explicit sequence number. The method also involves incrementing the implicit sequence number; determining the authentication tag by applying the implicit sequence number and an uncompressed payload to an authentication function; compressing the uncompressed payload to yield a compressed payload; and encrypting the compressed payload to yield the compressed encrypted payload.

In one feature, the method further involves encrypting the authentication tag. The non-secure data communication network may comprise a VPN over a 56 Kbps link, a link that uses a G.729 or G.711 codec, etc. The method can involve creating the SPI as a variable-length codeword selected from a prefix-free code. As an optimization, the code can have codewords whose sizes are all multiples of bytes, and thus is "octet aligned."

In another aspect, the invention provides a method of compact secure data communication, involving receiving from a sender over a non-secure data communication network, a data packet comprising a security parameter index value, an explicit sequence value, a compressed encrypted payload, and a first authentication tag value, and estimating an implicit sequence value based on the explicit sequence value. The method determines whether the packet has been replayed, based on the implicit sequence value. When the packet has not been replayed, the compressed encrypted payload is decompressed to yield an uncompressed payload, and the uncompressed payload and implicit sequence value are checked with** an authentication function. The data packet is accepted when a second authentication tag value generated by the authentication function matches the first authentication tag value.

In one embodiment, a compact security protocol provides cryptographic services on IP, UDP, and TCP packets with minimal bandwidth degradation due to encapsulation overhead. The disclosed protocol may be used, for example, in converged networks that carry both voice-over-IP and data traffic in and wireless networks, in which it is imperative to minimize per-packet overhead. The disclosed protocol provides as much security as possible, by authenticating the uncompressed headers rather than the compressed headers.

Further, the problem of communicating VoIP over IPsec VPNs on slow links is solved by combining a header compression step with the encryption and authentication steps, in a manner that is optimal with respect to both security and compression. Combining these two operations, rather than layering them, enables the disclosed protocol to provide better security and better compression.

Further, unlike systems that use the Secure RTP protocol, in the present approach the IPsec gateway need not be included in or aware of the VoIP signaling traffic. The standard traffic classification heuristics used to identify RTP traffic in IPHC can be used by the header compression algorithm in the present approach.

Embodiments are appropriate for use with stateful compression algorithms, for which the decompression procedure for a packet is allowed to depend on the value of earlier packets. IP header compression as described in RFC 2507, which reduces encapsulation overhead by reducing the size of packet headers, is the most important application of stateful compression.

In one specific approach, the sender authenticates the plaintext, compresses the plaintext, and then encrypts the compressed payload and the authentication tag. The receiver relies on the failure of the authentication check to discover decompression failures. This approach eliminates the need for a separate checksum for that purpose, as described in Section 2.2. of the document http://www.ietf.org/internet-drafts/draft-ietf-avt-crtp-enhance-07.txt, which describes the enhanced compressed RTP protocol. The authentication of the pre-compression plaintext ensures that an attacker that re-orders packets cannot fool the receiver by confusing the decompressor.

In one embodiment, the disclosed approach allows the use of shorter security parameter index ("SPI") values than ESP. In one approach, a variable-length SPI is used, which is unambiguous because it is a codeword of a prefix-free code. In one embodiment, all codewords in the code are octet-aligned. Further, the disclosed approach eliminates other overhead found in ESP by making the Next Header field implicit, and by eliminating the length-hiding feature of ESP.

In other aspects, the invention encompasses a computer apparatus and a computer-readable medium configured to carry out the foregoing steps.

2.0 Compact Security Protocol

A compact security protocol is now described. First, the protocol is described in terms of its functional elements, and the fields of the protocol format are described. In later sections, sender-side and receiver-side packet processing methods are defined. The disclosed protocol transports packets while providing encryption, stateful compression, message authentication, and anti-replay protection. The protocol can provide security protection and header compression to IP packets. As compared to IPsec ESP, the disclosed protocol provides significantly less encapsulation overhead.

For purposes of describing a clear example, the approaches herein are described in the context of using IKE to negotiate keys for a secure VPN tunnel between a sender and a receiver. The sender and receiver may be hosts or end stations as in FIG. 1A. However, the approaches described herein are fully applicable to other contexts that use other encryption or secure communication methods for other purposes.

2.1 Functional Elements

FIG. 1A is a block diagram of a network context in which an embodiment can be used. First and second end stations 101, 107 are communicatively coupled to network 104 indirectly through respective hosts 102A, 102B. End stations 101, 107 may be computers, workstations, IP phones, servers, or any other processing systems that need to communicate securely. Network 104 may comprise a local area network, wide area network, internetwork, or a combination thereof. Typically network 104 is relatively un-trusted, so that encryption techniques are desirable or necessary to provide for secure communication through the network.

Hosts 102A, 102B typically comprise routers, switches, gateways, or other network elements that cooperate to communicate packet data through network 104. Alternatively, hosts 102A, 102B may be computers, workstations, or other end stations that have the functional elements described herein.

Hosts 102A, 102B may establish one or more virtual private network (VPN) tunnels 110 through network 104. Using VPN tunnel 110, host 102A can communicate encrypted information with host 102B; traffic originating from end station 101 is encrypted at host 102A, sent in encrypted form over the VPN tunnel, decrypted at host 102B, and provided to end station 107. In this manner, end stations 101, 107 can communicate securely, even when network 104 is not trusted.

For purposes of illustrating an example, FIG. 1A illustrates a limited number of end stations and hosts. However, in a practical system, there may be any number of end stations and hosts. To further illustrate an example, internal elements of host 102B are shown in FIG. 1A. Each of the hosts 102A, 102B comprises an operating system 106 that hosts an IPsec agent 108 and a compact security agent 120.

IPsec agent 108 manages a security association database 108B that stores data for a plurality of IPsec security associations (SAs). Each SA is indexed by a security parameters index (SPI) value 144. For clarity, only one SPI value 144 is shown in FIG. 1B, but in practice there may be any number of SPI values that index corresponding SA entries.

Compact security agent 120 can access the security association database 108B, and manages CSP state data 124. According to one embodiment, both the sender and receiver of packets under the protocol herein, such as hosts 102A, 102B, maintains certain state information that is used in performing sending and receiving operations as defined herein. The specific contents of CSP state data 124 are described further below.

Compact security agent 120 also can access and store entries in an anti-replay database 122, which stores information indicating whether the compact security agent has previously processed particular packets. Anti-replay database 122 includes an Explicit Sequence Number 132 and a Rollover value 134. The Explicit Sequence Number 132 is a counter used to identify an order or sequence of successive packets processed by compact security agent 120. The Rollover value 134 specifies the number of times that the Explicit Sequence Number has reached its maximum value and "rolled over" to a zero value. Use of these values is described further below.

Compact security agent 120 stores an Implicit Sequence Number (ISN) 125, which may be a stored numeric value in any format. The ISN 125 specifies a sequence order of packets that are processed using the techniques herein, and typically is monotonically incremented as the processes herein are performed.

Compact security agent 120 also can access, call or use a message authentication function 126, compression function 128, and encryption function 130. Message authentication 126 may implement the Hashed Message Authentication Code-Secure Hash Algorithm (HMAC-SHA-1), the HMAC-MD-5 message digest algorithm or any other keyed message authentication process that generates, as output, an authentication tag or value that is representative of an input message. Compression function 128 is used to reduce the size in bits of a payload, and may be the enhanced compressed RTP protocol (ECRTP), IPHC, CRTP, or ROHC. Encryption function 130 is used to encrypt portions of a message, and typically is an implementation of a symmetric encryption algorithm such as DES. The encryption function 130 also can decrypt portions of a message.

The specific authentication function and encryption function that are used for a particular message may vary from session to session between a sender and receiver, and are identified for each session by security association parameter values in the security association database 108B. Typically the same compression function 128 is used for all sessions of a sender or receiver.

The use of these elements in packet processing is described further in the sections below.

2.2 Protocol Packet Format

FIG. 1B is a block diagram of a packet formatted according to a compact security protocol. Generally, a packet 142 comprises a security parameter index ("SPI") 144 that may be one to four octets in length. The SPI 144 is followed by an explicit sequence number ("ESN") 146. The ESN 146 is followed by a compressed data payload 148 of variable length. The packet is completed with an authentication tag 150 of variable length. The compressed payload 148 and authentication tag 150 are encrypted when packets 142 are communicated over non-secure networks, and are collectively referred to as encrypted payload 308.

As described further below, data communication using packets of the format of FIG. 1B achieves message authentication by providing an authentication tag that is based on the sequence number and the uncompressed payload. Confidentiality is achieved through encryption of the compressed payload and the authentication tag.

As depicted in FIG. 1B, in one embodiment packet 142 comprises a two-octet Explicit Sequence Number or ESN 146. In one embodiment, the Implicit Sequence Number (ISN) 125 stored by both the sender and receiver is an eight-octet numeric value, and ESN 146 is the least significant two octets of that value. In one embodiment of processing packets 142, both the ISN and the ESN are considered as octet strings, each octet of which holds a radix 256 digit of the integer represented by the string, with the most significant octet first. Implementations may, of course, store these values in any format of their choice. A 16-bit ESN 146 is used on the assumption that the maximum reorder or packet-loss burst length for flows protected by the disclosed protocol will be less than 65,535. However, if the maximum reorder or packet-loss burst length is different, then the ESN 146 may have a different length.

The compression of RTP and other protocols that use a sequence number can be increased by leveraging the sequence number provided in the present approach. For example, a decompressor can compute the RTP sequence number by adding an offset value to the explicit sequence number. This optimization would save two octets, but would require changes to the compressor/decompressor that are involved in performing compression for RTP or the other protocols.

The Compressed Payload field 148 holds the payload, after application of a compression function. Compressed Payload 148 contains a context identifier that identifies the decompression context and decompression algorithm that should be used by the receiver. The width of Compressed Payload field 148 can vary with each distinct packet, and its length can be determined by subtracting the lengths of the SPI, ESN, and Authentication Tag fields from the total length of the packet format. The total length is carried by the underlying transport, which may be IP or another protocol.

Authentication Tag 150 holds the output of a message authentication function. The width of Authentication Tag 150 may be fixed for a given security association, or can vary for different types of packets on the same SA, or can vary across distinct SAs. An approach in which the width of Authentication Tag 150 varies for different types of packets on the same SA is termed.

"adaptive authentication." This mechanism provides two levels of authentication strength, full and fractional. Each payload type is assigned a fixed level of authentication strength, as described **in Table 1. For packets containing payloads slated for full authentication, the full-length Authentication Tag is computed and included in the packet. For packets containing payloads slated for fractional authentication, a smaller Authentication Tag is computed and included in the packet. For this reason, the approaches herein require both an authentication tag size and a fractional tag size to be specified. An implementation of these approaches must be able to generate and receive a fractional tag size of four octets. This default size must be used if no other size is negotiated.

IPHC defines packet types in Section 3.1 of the IPHC specification. The COMPRESSED_UDP and COMPRESSED_RTP payload types are defined in the CRTP specification.

TABLE 1

AUTHENTICATION LEVELS FOR DIFFERENT PAYLOAD TYPES

| Payload Type | Authentication |
| --- | --- |
| FULL_HEADER | Full |
| COMPRESSED_NON_TCP | Full |
| COMPRESSED_TCP | Full |
| COMPRESSED_TCP_NODELTA | Full |
| CONTEXT_STATE | Full |
| COMPRESSED_UDP | Full |
| COMPRESSED_RTP | Fractional |

The adaptive authentication mechanism preserves the security of the payload types that use full authentication. An adversary who cannot forge messages protected by full authentication cannot fool a receiver into accepting a packet with a packet type requiring full authentication that is protected with only a fractional tag. This is because the payload type from which the authentication level is determined is protected by the Authentication Tag.

Using short authentication tags is acceptable for many applications, but is not acceptable for all applications.

The SPI 144 is generally used in a manner similar to the SPI as defined in IPsec ESP, but has a variable length in order to provide more compactness. According to one embodiment, each SPI value is an octet string codeword selected from an octet-aligned prefix-free code (OPC), so that each SPI can be unambiguously parsed from an octet stream. As a result, each SPI value can be viewed as explicitly carrying its own length, and no signaling or negotiation of SPI length is needed. This property enables an implementation of the protocol herein to assign the shortest SPI values that it can. For example, one-octet SPI values could be assigned first, and longer SPI values could be assigned if and when needed. However, an implementation can choose SPI values in any particular way.

According to one embodiment, in each codeword of the octet-aligned prefix-free code, the most-significant bit of the least-significant octet is zero; all other octets have a most-significant bit set to one. Each codeword has one of the four forms set forth in Table 2:

TABLE 2

POSSIBLE FORMS FOR CODEWORDS

1xxxxxx1xxxxxx1xxxxxx0xxxxxx
1xxxxxx1xxxxxx0xxxxxx
1xxxxxx0xxxxxx
0xxxxxx

In Table 2, "x" indicates either a zero or a one. Four-octet OPC codewords can represent $2^{28}$ distinct integer values. Translation between OPC codewords and the integer values to which they correspond may be performed using an appropriate software function. Sample code for reading and writing codewords and integer values is provided in the Appendix. I didn't know we could make appendices to these applications—I learn something new every day.

Referring again to FIG. 1A, in one embodiment CSP state data 124 of host 102B includes:

1. the Implicit Sequence Number 125,
2. anti-replay information (e.g. the RFC 2401 Appendix A bitmask),
3. the type, parameters, and keys used by message authentication function 126,
4. the type, parameters, and keys of encryption function 130A,
5. the type, parameters, and contexts of compression function 128, and
6. the identity of a complementary simplex SA, if the SA is part of a duplex connection.

Specific state values are coordinated between the sender and receiver. Preferably, the state values are exchanged using a key exchange mechanism such as the Internet Key Exchange, as defined in Harkins et al., RFC 2409, The Internet Key Exchange (IKE), 1998. A duplex connection consists of two complementary simplex connections. A pair of complementary SAs created simultaneously by IKE is assumed to be a duplex connection.

2.3 Packet Processing Methods

Figure 2A:
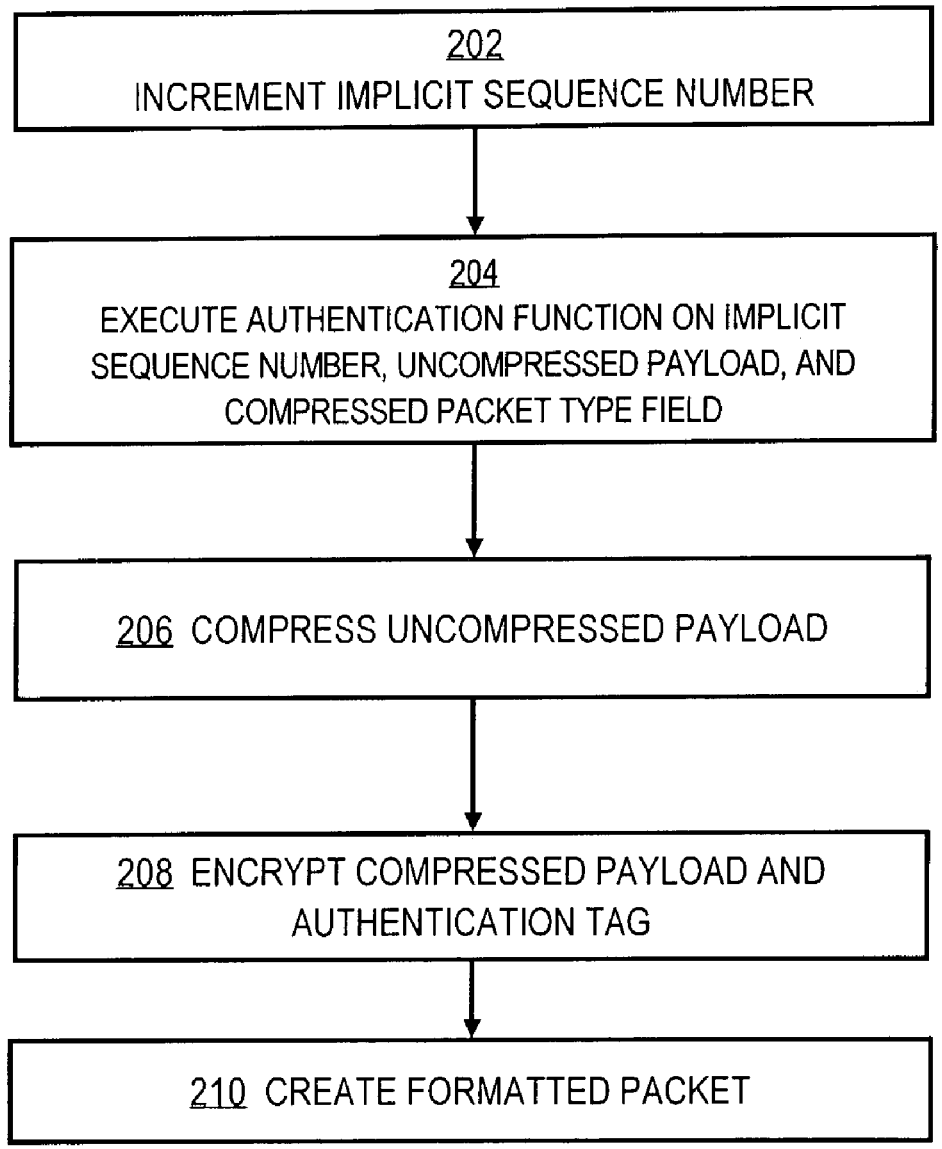
FIG. 2A is a flow diagram showing a method of processing packets according to a compact security protocol, as performed by a sender of such packets.
Figure 2B:
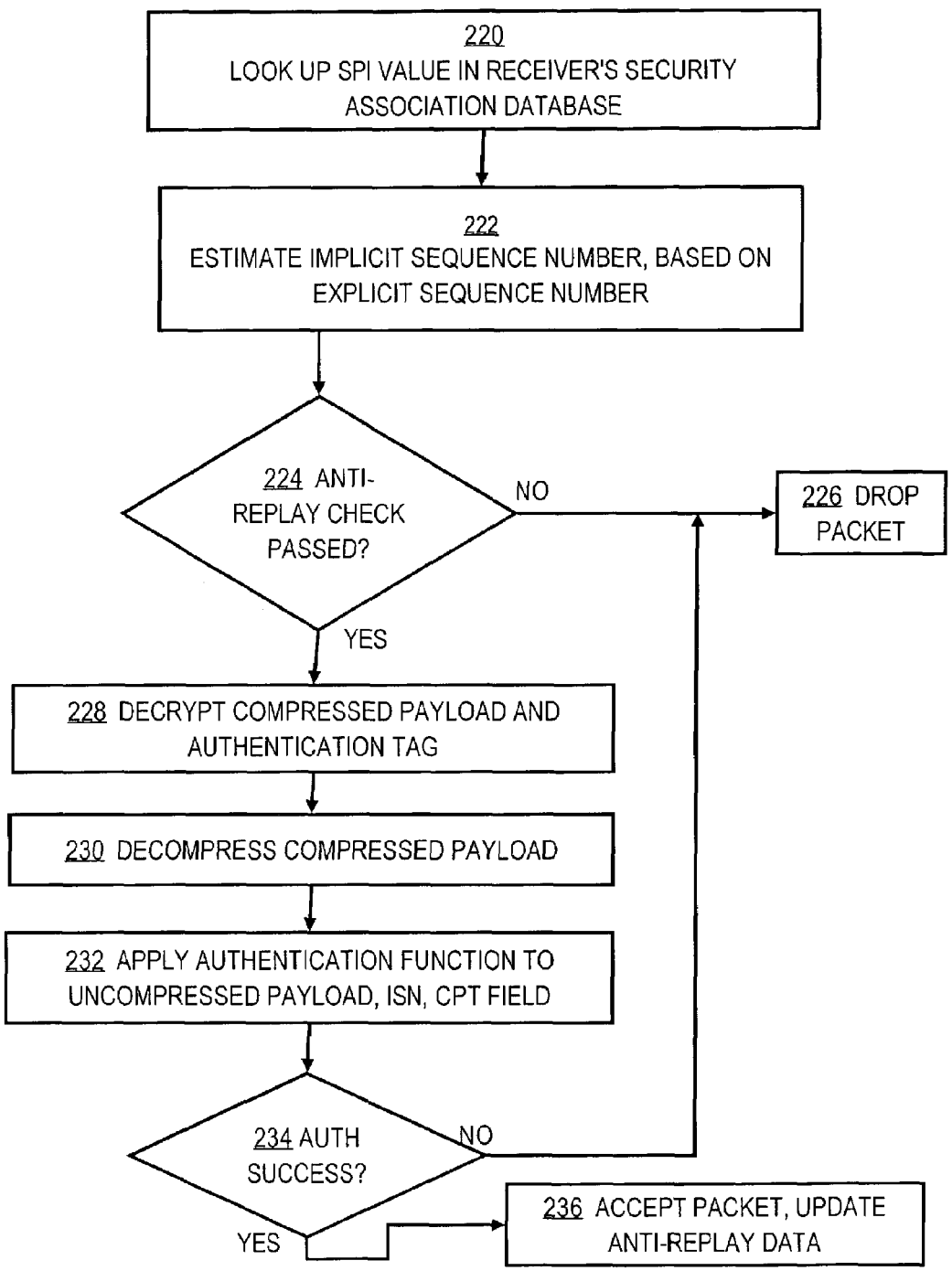
FIG. 2B is a flow diagram showing a method of processing packets according to a compact security protocol, as performed by a receiver of such packets.
Figure 3A:
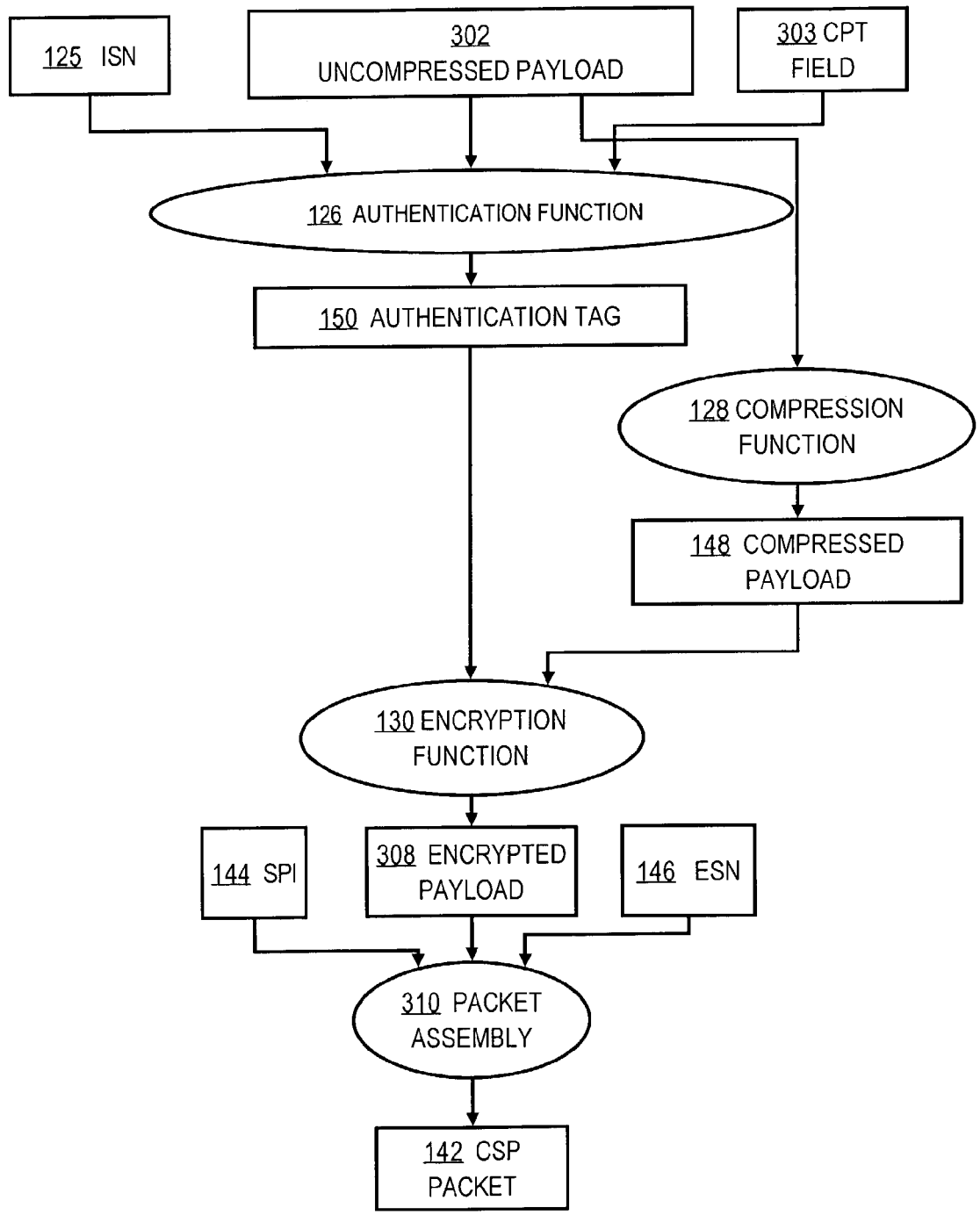
FIG. 3A is a data flow diagram showing data values and data processing functions that can be used in implementing FIG. 2A.
Figure 3B:
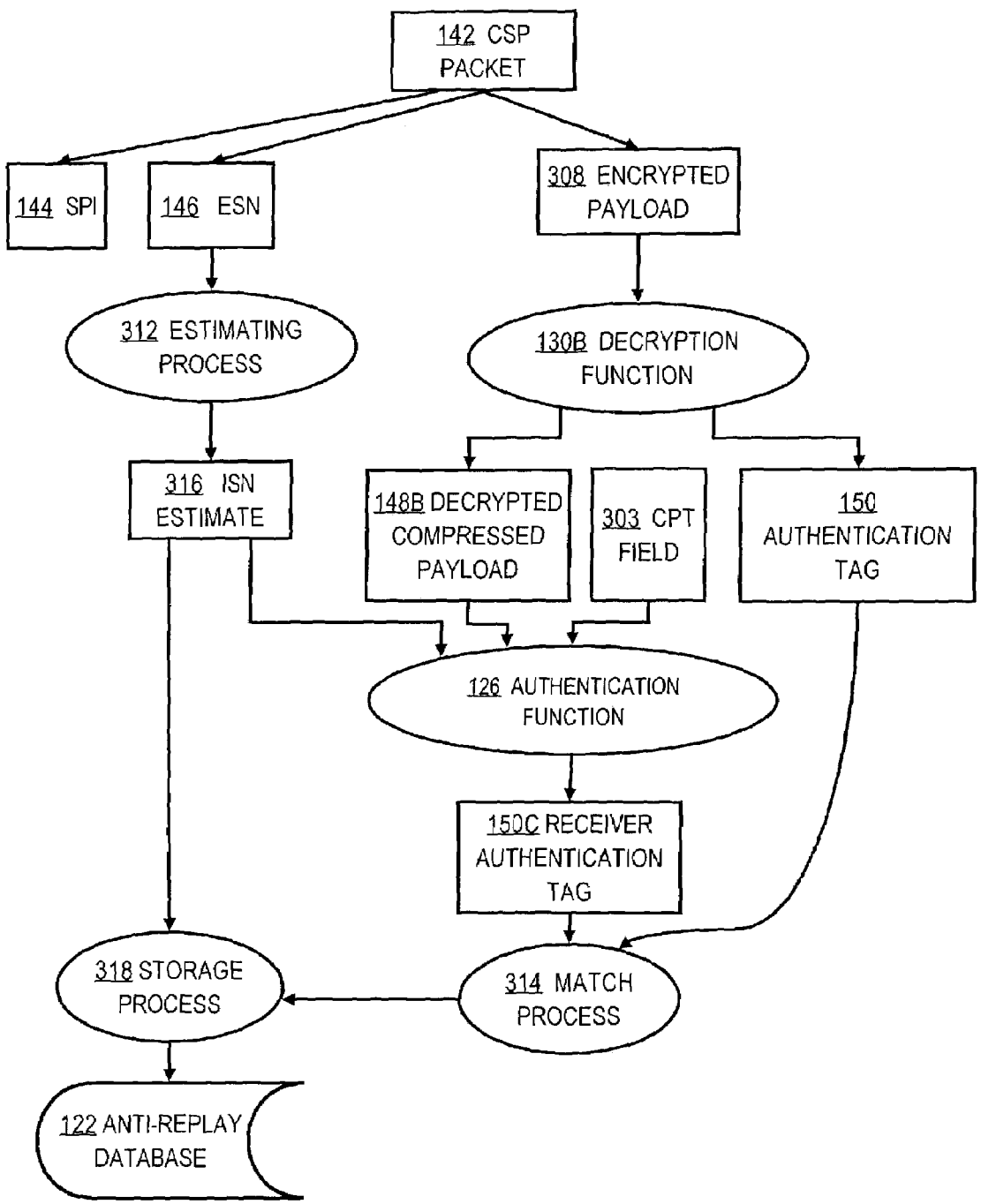
FIG. 3B is a data flow diagram showing data values and data processing functions that can be used in implementing FIG. 2B.

FIG. 2A is a flow diagram showing a method of processing packets according to a compact security protocol, as performed by a sender of such packets. FIG. 2B is a flow diagram showing a method of processing packets according to a compact security protocol, as performed by a receiver of such packets. FIG. 3A is a data flow diagram showing data values and data processing functions that can be used in implementing FIG. 2A. FIG. 3B is a data flow diagram showing data values and data processing functions that can be used in implementing FIG. 2B.

The process of FIG. 2A, which is described below first, assumes that previously a sender and receiver, such as hosts 102A, 102B of FIG. 1A, have negotiated an IPsec security association. In one embodiment, such pre-processing further involves selecting a SPI value, such as a prefix-free octet-aligned SPI value in the manner described above. Typically the receiver is responsible to select the SPI value and communicate it as part of IPsec SA negotiation. After such pre-processing, the sender can prepare and send packets to the receiver using the techniques described below.

The process of FIG. 2A further assumes that compact security agent 120 has received a packet for transmission to the receiver, which is referred to herein as the Uncompressed Payload. The Uncompressed Payload may be an IP packet or other data that is passed to the compact security agent 120 by elements of operating system 106. The process further assumes that the sender stores and can access the Implicit Sequence Number value 125, and have access to authentication function 126, compression function 128, and encryption function 130.

In block 202, the sender increments the Implicit Sequence Number. For example, host 102B increments the value of Implicit Sequence Number value 125. The sender also increments and stores the Explicit Sequence Number 146; if the ESN has its maximum value ($2^{16}$=65,535) before incrementing, then it is reset or "rolled over" to a zero value. For example, ESN 146 is incremented and stored.

In block 204, an authentication function is executed over the Implicit Sequence Number, which is formatted with the most-significant octet first, the Uncompressed Payload and, for IP packets, the Compressed Payload Type (CPT) field. The CPT field identifies the type of the Compressed Payload. For example, in IPHC, valid types include COMPRESSED_TCP, COMPRESSED_TCP_NODELTA, COMPRESSED_NON_TCP, CONTEXT_STATE, and FULL_HEADER. The CPT field indicates the type of payload carried to the decompressor in a payload that is compressed using the techniques herein. As indicated in FIG. 3A, inputs to authentication function 126 include ISN 125, Uncompressed Payload 302, and CPT field 303; Authentication Tag 150 is generated as output.

In block 206, a compression algorithm is executed on the Uncompressed Payload, resulting in creating a Compressed Payload. For example, compact security agent 120 calls compression function 128, provides the Uncompressed Payload 302 as a parameter, and receives the Compressed Payload 148 as a result value, as shown in FIG. 3A.

In block 208, the Compressed Payload and the Authentication Tag are encrypted. For example, as shown in FIG. 3A, compact security agent 120 calls encryption function 130, provides the Compressed Payload 148 and Authentication Tag 150 as parameters, and receives an Encrypted Payload 308 as a result value.

In block 210, a packet conforming to the format of FIG. 1B is created. As shown in FIG. 3A, a packet assembly process 310 of compact security agent 120 assembles packet 142 from the SPI 144 previously negotiated among the sender and receiver, the Explicit Sequence Number 146, and the Encrypted Payload 308 consisting of the Compressed Payload and the Authentication Tag. The packet 142 is then dispatched to a receiver using any appropriate transport protocol.

Referring now to FIG. 2B and FIG. 3B, receiver-side processing may involve the following steps. In block 220, receiver looks up the SPI value in its security association database. For example, host 102A as receiver separates a packet 142 into SPI 144, ESN 146, Compressed Payload 148A and Authentication Tag 150A, as shown in FIG. 3A. Host 102A then looks up the SPI value 144 in the security association database 108B maintained at the receiver. The lookup yields an SA indicating which decryption function and authentication function should be used in later steps.

In block 222, the receiver estimates the Implicit Sequence Number maintained by the sender, based on the Explicit Sequence Number in the packet. As shown in FIG. 3B, ESN 146 is provided to an estimating process 312, resulting in generating an ISN estimate 314.

According to one embodiment, such estimation is performed as follows. The receiver stores ESN 146 and Rollover value 134, respectively, as a 16-bit explicit sequence number S, and a 48-bit value R. The value R counts the number of times that S has incremented to its maximum value ($2^{16}$=65,535) and rolled over to zero. The values of R and S are part of the receiver's anti-replay data.

As a general concept, the concatenation of the rollover counter R with the value S forms the implicit sequence number. In practice, upon receipt of a packet containing the explicit sequence number E, the implicit sequence number is estimated as the value I defined by $$I=2^{16}*A+E,$$

where A is selected from the set {R−1, R, R+1} such that I is closest to the value $2^{16}$*R+S. However, if the value of R is zero, then I is estimated as E; further, if the value of R is $2^{48}$−1, then I is estimated as I=$2^{16}$*(R−1)+E.

After a packet has been authenticated as valid, the Implicit Sequence Number 125 is entered into the anti-replay database. In one approach, if A equals R+1, then R is incremented; otherwise, R is left unchanged. If E is greater than S, then S is set to E; otherwise, it is left unchanged. The bitmask containing the anti-replay information, as defined by RFC 2401 Appendix A, is updated as described in that document.

Preferably, upon receiving a packet, the receiver does not change its local values of R and S or update such values in the anti-replay database until the packet has passed the authentication check.

In block 224, anti-replay information is checked, using the Implicit Sequence Number constructed above. The anti-replay check involves determining whether the receiver has previously processed a packet having the same Implicit Sequence Number. For example, host 102A looks up the ISN 125, which it created using the process above, in the anti-replay database 122. If the ISN 125 is found in the anti-replay database 122, then the anti-replay check fails. If the ISN 125 is not found in the anti-replay database 122, then the anti-replay check succeeds.

If the check fails, the packet is dropped, as indicated in block 226. If the check succeeds, then control passes to block 228, in which the Compressed Payload and the Authentication Tag are decrypted. As shown in FIG. 3B, Compressed Payload 148 and Authentication Tag 150 from packet 142 are provided to decryption function 130, which generates Decrypted Compressed Payload 148B and Decrypted Authentication Tag 150B as output.

In block 230, the decompression function is applied to the Compressed Payload, resulting in creating an estimate of the Uncompressed Payload. As shown in FIG. 3B, decompression function 128 generates Uncompressed Payload 302 as output.

In block 232, the authentication function is used to check the Implicit Sequence Number, the Uncompressed Payload, and the CPT field. As shown in FIG. 3B, authentication function 126 receives Uncompressed Payload 302, ISN Estimate 314, and CPT field 303, and generates Receiver Authentication Tag 150C as output.

If the Receiver Authentication Tag 150C matches the Authentication Tag 150 in the packet, as tested in block 234 and as indicated by match process 314 of FIG. 3B, then the Decompressed Payload is assumed to be correct. Control then passes to block 236, in which the packet is accepted and the Implicit Sequence Number Estimate 314 is entered into the anti-replay database 122 and the decompression context is updated, if needed. Otherwise, control passes to block 226 at which the packet is dropped.

2.4 Other Implementation Details

In one embodiment, the protocol herein is used with cryptographic transforms that minimize packet expansion, such as AES Integer Counter Mode (ICM) and SEAL. Further, embodiments are used with the smallest Authentication Tag size that provides the required amount of security.

An implementation of the techniques herein may use any of a variety of header compression and decompression algorithms. An implementation that uses IP Header Compression as defined in RFC 2507 should observe the following constraints. First, IP versions four and six headers should use the INFERRED checksum option. Second, UDP should use an INFERRED checksum, except in the case of a zero checksum, in which case the checksum should be NOCHANGE. Third, TCP should use the INFERRED option for its checksum. For TCP, RFC 2507 does not recommend using the INFERRED option, but doing so makes better use of bandwidth. This technique trades off code re-use against optimality, and other implementations may elect a different tradeoff, if changes to the compressor and decompressor are acceptable.

2.5 Improvements Over Existing Practice

The techniques herein enable secure communication using minimal overhead. Table 3 illustrates the improvements provided by these techniques, by comparing the overhead introduced by the present techniques and by the prior ESP approach, when communicating, as an example, a 20-octet G.729 payload:

TABLE 3

OVERHEAD OF COMPACT SECURITY APPROACH AND ESP

| Field | Compact Approach Overhead | Overhead from ESP |
|---|---|---|
| SPI | 1.5 octets (average) | 4 octets |
| SN | 2 octets | 4 octets |
| NH, Pad Len | 0 2 octets | |
| IV | 0 8 or 16 octets | |
| Padding | 0 6 or 14 octets | |
| ICV | 4 octets | 12 octets |
| Total | 7.5 (38%) | 36 (270%) or 52 (360%) |

In the techniques herein, operations are ordered so that a receiver implements decryption followed by decompression followed by message authentication. This ordering benefits both security and compactness. Further, it allows the header compression method to leave all of checksum fields as INFERRED, thus preventing the need to transmit those fields. For typical IP, TCP, and UDP packets, a savings of at least four octets of data is achieved.

Message authentication benefits because the input to the authentication functions is the uncompressed data. In contrast, in IPsec ESP decompression can only be applied after authentication, which leaves open the possibility that the decompression algorithm could be confused by an adversary who deletes and reorders packets.

The Pad Length and Padding fields of IPsec ESP are not present in the packet format disclosed herein, for two reasons. First, no padding for alignment purposes is needed, since no particular alignment of fields is mandated. Second, no padding is needed for the purposes of hiding the length of a message, since that is inappropriate whenever compactness is needed.

No security services are provided on the SPI, since doing so provides no security advantage, and not doing so admits greater separation of components in an implementation.

Accordingly, a compact security protocol has been described that can provide confidentiality of the payload field, provide message authentication for the payload field, prevent replay attacks, and have a minimum expansion due to encapsulation overhead. Because the cryptographic message authentication check will detect malformed packets, it is not necessary to explicitly carry any checksum data in the compressed headers.

In contrast to prior approaches, the approach herein provides far better bandwidth utilization than voice-over-IPsec, while providing equivalent security. The present approach is better than a layered ESP/header compression approach, providing better compression and better security. The present approach is simpler than approaches that require an IPsec implementation to track VoIP flows, because in practice, call tracking is extremely difficult due in part to the complexity and variety of call-signaling protocols.

The present approach can improve software cryptographic processing performance in some cases, since the compression operation is less computationally intensive than the encryption operation, and compression results in smaller plaintext sizes. The present approach can be implemented in VPN processing platforms, in both software and in hardware accelerators. The techniques herein are useful for IPsec products intended for WAN use, since bandwidth utilization is important for WANs.

4.0 Implementation Mechanisms—Hardware Overview

Figure 4:
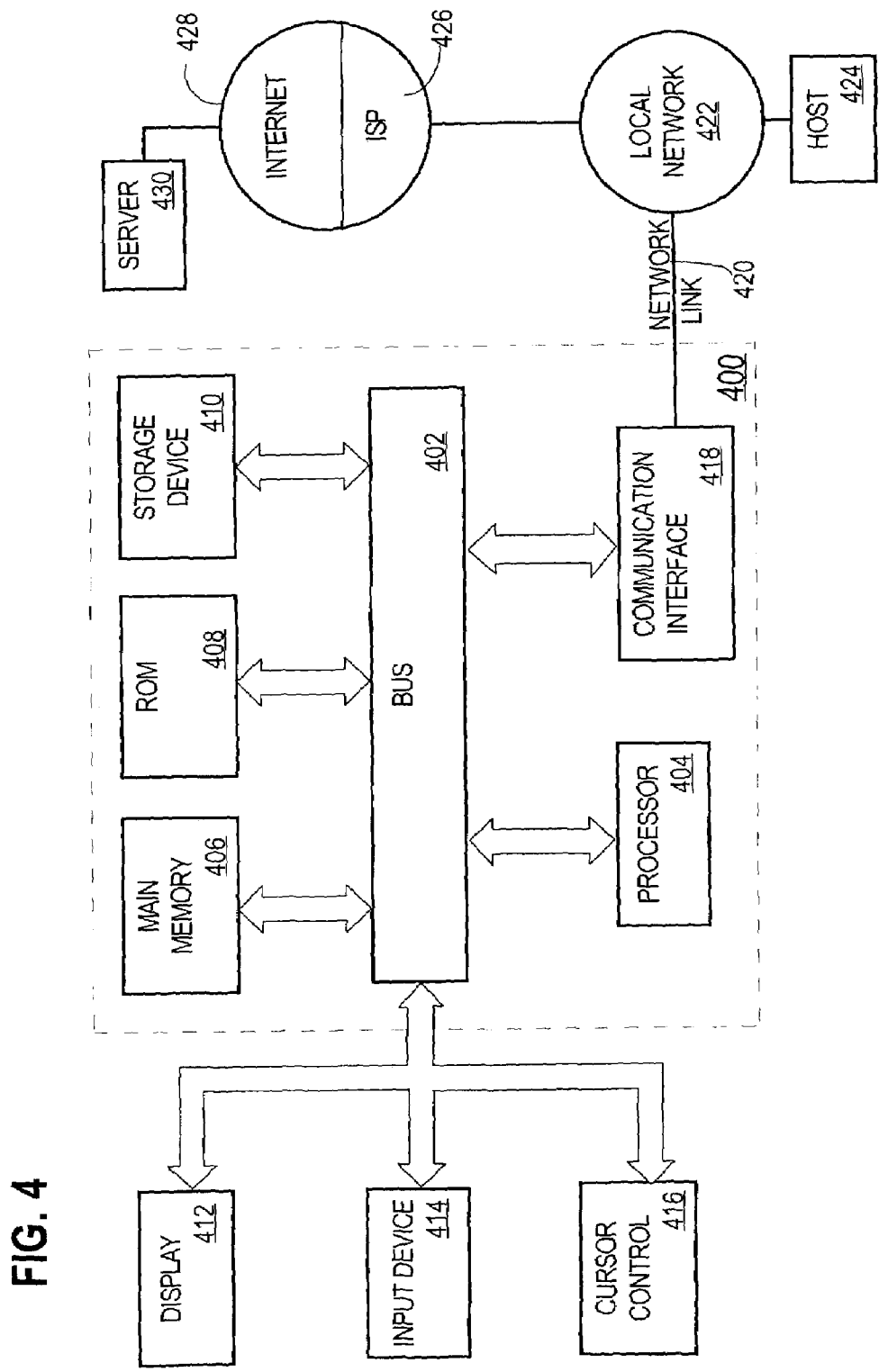
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to predetermined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for providing a compact secure data communication. According to one embodiment of the invention, compact secure data communication is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for compact secure data communication as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX

```
1               Example code for OPC
2
3   This appendix provides an example of C code functions that read
4   and write OPC codewords from and to an octet stream.
5
6   /*
7    * octet-aligned prefix-free code (opc) functions
8    */
9
10  typedef unsigned long opc_t;      /* represents an OPC codeword */
11  typedef unsigned char octet_t;    /* represents an octet        */
12
13  int write_opc_codeword(octet_t **stream_ptr, opc_t codeword) {
14      octet_t *stream = *stream_ptr;
15
16      /* verify that we've been passed a proper codeword */
17      if (!(codeword & 0x80808080)
```

APPENDIX-continued

```
18    return -1;
19
20    /* write out octets of codeword */
21    while (!(codeword & 0x80)) {
22      *stream++ = codeword & 0xff;
23      codeword >>= 8;
24    }
25
26    /* advance stream pointer */
27    *stream_ptr = stream;
28
29    /* indicate success by returning 1 */
30    return 1;
31
32  }
33
34  int read_opc_codeword(octet_t **stream_ptr, opc_t *codeword) {
35    octet_t *stream = *stream_ptr;
36    octet_t tmp;
37    int octet_count;
38
39    /* initialize codeword to zero */
40    *codeword = 0;
41
42    /* read in octets of codeword */
43    octet_count = 0;
44    do {
45      *codeword <<= 8;
46      tmp = *stream++;
47      *codeword |= tmp;
48
49      /* if we've read more than four octets, indicate an error */
50      if (octet_count++ == 4)
51        return -1;
52    } while(tmp & 0x80);
53
54
55    /* indicate success by returning value > 0*/
56    return octet count;
57
58  }
```

What is claimed is:

1. A method of providing compact secure data communication, the method comprising the computer-implemented steps of:

receiving from a sender over a non-secure data communication network, a data packet comprising a security parameter index value, an explicit sequence value, a compressed encrypted payload, and a first authentication tag value;

estimating an implicit sequence value based on the explicit sequence value;

determining whether the packet has been replayed, based on the implicit sequence value; when the packet has not been replayed;

decrypting the compressed encrypted payload to yield an uncompressed payload;

applying the uncompressed payload and implicit sequence number to an authentication function; and accepting the data packet when a second authentication tag value generated by the authentication function matches the first authentication tag value, wherein the estimating step comprises the steps of:

for the explicit sequence value E, estimating the implicit sequence value as a value I defined by $I=2^{16}*A+E$, where A is selected from a set $\{R-1, R, R+1\}$ such that I is closest to a value $2^{16}*R+S$;

wherein S represents a prior explicit sequence value;

wherein a rollover value R counts a number of times that S has incremented to its maximum value ($2^{16}=65,535$) and rolled over to zero;

wherein if the value of R is zero, then I is estimated as E;

wherein if the value of R is $2^{48}-1$, then I is estimated as $I=2^{16}*(R-1)+E$.

2. A method as recited in claim 1, further comprising the steps of:

modifying the implicit sequence value by performing the steps of:

if A equals R+1, then incrementing R, otherwise leaving R unchanged;

if E is greater than S, then setting S to E; otherwise, leaving S unchanged; and entering the modified implicit sequence value into an anti-replay database.

3. A method as recited in claim 1, wherein the data packet comprises a security parameter index value that indexes a security association that has been negotiated between a sender and a receiver and is stored in a security association database at the sender, an explicit sequence value, a compressed encrypted payload, and an authentication tag value.

4. A method as recited in claim 1, wherein the explicit sequence value comprises a least-significant subset of octets of an implicit sequence number that is stored internally by a sender and that has a size in octets larger than the explicit sequence number.

5. A method as recited in claim 1, wherein the explicit sequence value comprises a least-significant two octets of an implicit sequence number that is stored internally by a sender and that has a size of eight octets.

6. The method as recited in claim 1, wherein the explicit sequence value comprises a least-significant subset of octets of an implicit sequence number that is stored internally by a sender and that has a size in octets larger than the explicit sequence number, and wherein the authentication tag is determined by applying an authentication function to an implicit sequence value and an uncompressed payload.

7. A method as recited in claim 1, wherein the authentication tag is encrypted, and further comprising the step of decrypting the authentication tag.

8. A method as recited in claim 1, wherein the non-secure data communication network comprises a VPN over a link that communicates data at 56 Kbps or more.

9. A method as recited in claim 1, wherein the non-secure data communication network comprises a link that uses a G.729 codec.

10. A method as recited in claim 1, further comprising the step of creating the SPI as a variable-length codeword selected from a prefix-free octet-aligned code.

11. A computer-readable medium carrying one or more sequences of instructions for providing compact secure data communication, which instructions, when executed by one or more processors, cause the one or more processors to carry out the steps of:

receiving from a sender over a non-secure data communication network, a data packet comprising a security parameter index value, an explicit sequence value, a compressed encrypted payload, and a first authentication tag value;

estimating an implicit sequence value based on the explicit sequence value;

determining whether the packet has been replayed, based on the implicit sequence value;

when the packet has not been replayed:

decrypting the compressed encrypted payload to yield an uncompressed payload;

applying the uncompressed payload and implicit sequence number to an authentication function; and accepting the data packet when a second authentication tag value generated by the authentication function matches the first authentication tag value, wherein the estimating step comprises the steps of:

for the explicit sequence value E, estimating the implicit sequence value as a value I defined by $I=2^{16}*A+E$, where A is selected from a set $\{R-1, R, R+1\}$ such that I is closest to a value $2^{16}*R+S$;

wherein S represents a prior explicit sequence value;

wherein a rollover value R counts a number of times that S has incremented to its maximum value ($2^{16}=65,535$) and rolled over to zero;

wherein if the value of R is zero, then I is estimated as E;

wherein if the value of R is $2^{48}-1$, then I is estimated as $I=2^{16}*(R-1)+E$.

12. A computer-readable medium as recited in claim 11, further comprising the steps of:

modifying the implicit sequence value by performing the steps of:

if A equals R+1, then incrementing R, otherwise leaving R unchanged;

if E is greater than S, then setting S to E; otherwise, leaving S unchanged; and entering the modified implicit sequence value into an anti-replay database.

13. An apparatus for providing compact secure data communication, comprising:

a network interface that is coupled to the data network for receiving one or more packet flows therefrom;

a processor;

one or more stored sequences of instructions which, when executed by the processor, cause the processor to perform:

receiving from a sender over a non-secure data communication network, a data packet comprising a security parameter index value, an explicit sequence value, a compressed encrypted payload, and a first authentication tag value;

estimating an implicit sequence value based on the explicit sequence value;

determining whether the packet has been replayed, based on the implicit sequence value;

when the packet has not been replayed:

decrypting the compressed encrypted payload to yield an uncompressed payload;

applying the uncompressed payload and implicit sequence number to an authentication function; and accepting the data packet when a second authentication tag value generated by the authentication function matches the first authentication tag value, wherein the estimating step comprises the steps of:

for the explicit sequence value E, estimating the implicit sequence value as a value I defined by $I=2^{16}*A+E$, where A is selected from a set $\{R-1, R, R+1\}$ such that I is closest to a value $2^{16}*R+S$;

wherein S represents a prior explicit sequence value;

wherein a rollover value R counts a number of times that S has incremented to its maximum value ($2^{16}=65,535$) and rolled over to zero;

wherein if the value of R is zero, then I is estimated as E;

wherein if the value of R is $2^{48}-1$, then I is estimated as $I=2^{16}*(R-1)+E$.

14. An apparatus as recited in claim 13, further comprising sequences of instructions which when executed cause the processor to perform:

modifying the implicit sequence value by performing the steps of:

if A equals R+1, then incrementing R, otherwise leaving R unchanged;

if E is greater than S, then setting S to E; otherwise, leaving S unchanged; and entering the modified implicit sequence value into an anti-replay database.

15. An apparatus as recited in claim 13, wherein the data packet comprises a security parameter index value that indexes a security association that has been negotiated between a sender and a receiver and is stored in a security association database at the sender, an explicit sequence value, a compressed encrypted payload, and an authentication tag value.

16. An apparatus as recited in claim 13, wherein the explicit sequence value comprises a least-significant subset of octets of an implicit sequence number that is stored internally by a sender and that has a size in octets larger than the explicit sequence number.

17. An apparatus as recited in claim 13, wherein the explicit sequence value comprises a least-significant two octets of an implicit sequence number that is stored internally by a sender and that has a size of eight octets.

18. An apparatus as recited in claim 13, wherein the explicit sequence value comprises a least-significant subset of octets of an implicit sequence number that is stored internally by a sender and that has a size in octets larger than the explicit sequence number, and wherein the authentication tag is determined by applying an authentication function to an implicit sequence value and an uncompressed payload.

19. An apparatus as recited in claim 13, wherein the authentication tag is encrypted, and further comprising the step of decrypting the authentication tag.

20. An apparatus as recited in claim 13, wherein the non-secure data communication network comprises a VPN over a link that communicates data at 56 Kbps or more.

21. An apparatus as recited in claim 13, wherein the non-secure data communication network comprises a link that uses a G.729 codec.

22. An apparatus as recited in claim 13, further comprising instructions which when executed by the processor cause creating the SPI as a variable-length codeword selected from a prefix-free octet-aligned code.

23. An apparatus for providing compact secure data communication, comprising:

means for receiving from a sender over a non-secure data communication network, a data packet comprising a security parameter index value, an explicit sequence value, a compressed encrypted payload, and a first authentication tag value;

means for estimating an implicit sequence value based on the explicit sequence value;

means for determining whether the packet has been replayed, based on the implicit sequence value;

means for decrypting the compressed encrypted payload to yield an uncompressed payload and for applying the uncompressed payload and implicit sequence number to an authentication function when the packet has not been replayed;

means for accepting the data packet when a second authentication tag value generated by the authentication function matches the first authentication tag value, wherein the estimating means comprises means, for the explicit sequence value E, for estimating the implicit sequence value as a value I defined by $I=2^{16}*A+E$, where A is selected from a set $\{R-1, R, R+1\}$ such that I is closest to a value $2^{16}*R+S$; wherein S represents a prior explicit sequence value; wherein a rollover value R counts a number of times that S has incremented to its maximum value ($2^{16}=65,535$) and rolled over to zero; wherein if the value of R is zero, then I is estimated as E; wherein if the value of R is $2^{48}-1$, then I is estimated as $I=2^{16}*(R-1)+E$.

24. The apparatus of claim 23, wherein the data packet comprises a security parameter index value that indexes a security association that has been negotiated between a sender and a receiver and is stored in a security association database at the sender, an explicit sequence value, a compressed encrypted payload, and an authentication tag value.

25. The apparatus of claim 23, wherein the explicit sequence value comprises a least-significant subset of octets of an implicit sequence number that is stored internally by a sender and that has a size in octets larger than the explicit sequence number.

26. The method as recited in claim 23, wherein the explicit sequence value comprises a least-significant subset of octets of an implicit sequence number that is stored internally by a sender and that has a size in octets larger than the explicit sequence number, and wherein the authentication tag is determined by applying an authentication function to an implicit sequence value and an uncompressed payload.

* * * * *